(12) United States Patent
Pang et al.

(10) Patent No.: US 12,509,760 B2
(45) Date of Patent: Dec. 30, 2025

(54) FORMING NANOTWINNED REGIONS IN A CERAMIC COATING AT A TUNABLE VOLUME FRACTION

(71) Applicant: University of Science and Technology Beijing, Beijing (CN)

(72) Inventors: Xiaolu Pang, Beijing (CN); Tao Guo, Beijing (CN); Kewei Gao, Beijing (CN)

(73) Assignee: University of Science and Technology Beijing, Beijing (CN)

( * ) Notice: Subject to any disclaimer, the term of this patent is extended or adjusted under 35 U.S.C. 154(b) by 645 days.

(21) Appl. No.: 17/891,342

(22) Filed: Aug. 19, 2022

(65) Prior Publication Data

US 2023/0015174 A1 Jan. 19, 2023

Related U.S. Application Data

(63) Continuation-in-part of application No. PCT/CN2021/106414, filed on Jul. 15, 2021.

(51) Int. Cl.
*C23C 14/34* (2006.01)
*C01B 21/06* (2006.01)
(Continued)

(52) U.S. Cl.
CPC ...... *C23C 14/3464* (2013.01); *C01B 21/0602* (2013.01); *C23C 14/0036* (2013.01);
(Continued)

(58) Field of Classification Search
CPC ............ C23C 14/3464; C23C 14/0036; C23C 14/0647; C23C 14/345; C23C 14/0641;
(Continued)

(56) References Cited

U.S. PATENT DOCUMENTS

| | | | |
|---|---|---|---|
| 8,420,185 B1* | 4/2013 | Chueh | C25D 7/123 427/551 |
| 2010/0119315 A1* | 5/2010 | Kathrein | C23C 16/45523 407/119 |

(Continued)

FOREIGN PATENT DOCUMENTS

| | | |
|---|---|---|
| CN | 106744820 | 5/2017 |
| CN | 109504947 | 3/2019 |

(Continued)

OTHER PUBLICATIONS

Xu, et al., "Uniting superhardness and damage-tolerance in a nanosandwich-structured Ti—B—N coating", 2014, Scripta Materialia, 74, 88-91 (Year: 2014).*

(Continued)

*Primary Examiner* — Patrick S Ott
(74) *Attorney, Agent, or Firm* — Henry Patent Law Firm PLLC

(57) ABSTRACT

In a general aspect, a ceramic thin film with nanotwinned regions at a tunable volume fraction is manufactured. In some aspects, a method for manufacturing a ceramic thin film on a surface of a substrate in an evacuated chamber is disclosed. The ceramic thin film includes crystalline grains; and each of the crystalline grains includes one or more nanotwinned regions. The one or more nanotwinned regions have a volume fraction in a range of 30-80% of the ceramic thin film. The ceramic thin film comprises titanium, nitrogen, and boron. A plurality of targets including a plurality of sputtering materials is prepared. A gas atmosphere in the evacuated chamber is formed. Electric power is supplied to the plurality of targets to cause co-sputtering of the plurality of sputtering materials to form the ceramic thin film with the one or more nanotwinned regions.

15 Claims, 14 Drawing Sheets

(51) Int. Cl.
    *C23C 14/00*     (2006.01)
    *C23C 14/06*     (2006.01)
    *C30B 25/06*     (2006.01)
    *C30B 25/18*     (2006.01)
    *C30B 29/38*     (2006.01)
(52) U.S. Cl.
    CPC ........ *C23C 14/0647* (2013.01); *C23C 14/345* (2013.01); *C30B 25/06* (2013.01); *C30B 25/18* (2013.01); *C30B 29/38* (2013.01)
(58) Field of Classification Search
    CPC ..... C01B 21/0602; C30B 25/06; C30B 25/18; C30B 29/38
    See application file for complete search history.

(56) References Cited

U.S. PATENT DOCUMENTS

| | | | | |
|---|---|---|---|---|
| 2015/0275350 | A1* | 10/2015 | Ott | C23C 14/541 |
| | | | | 204/192.15 |
| 2015/0376776 | A1* | 12/2015 | Datta | C23C 14/34 |
| | | | | 427/248.1 |
| 2020/0055725 | A1 | 2/2020 | Sim et al. | |
| 2020/0370161 | A1* | 11/2020 | Lefevre | C23C 14/24 |

FOREIGN PATENT DOCUMENTS

| | | |
|---|---|---|
| CN | 110144483 | 8/2019 |
| CN | 111463185 | 7/2020 |

OTHER PUBLICATIONS

Ott, et al., "Optimization of strength and ductility in nanotwinned ultra-fine grained Ag: Twin density and grain orientations", 2015, Acta Materialia, 96, 378-389 (Year: 2015).*

Heau, et al., "Ultrahard Ti—B—N coatings obtained by reactive magnetron sputtering of a Ti—B target", 1998, Surface and Coatings Technology, 108-109, 332-339 (Year: 1998).*

Zhou, et al., "Effects of modulation period on microstructure, mechanical properties of TiBN/TIN nanomultilayered films deposited by multi arc ion plating", 2016, Vacuum, 126, 34-40 (Year: 2016).*

WIPO, International Search Report and Written Opinion mailed Apr. 7, 2022, in PCT/CN2021/106414, 9 pgs.

An, et al., "Nucleation of amorphous shear bands at nanotwins in boron suboxide", Nature Communications, Mar. 22, 2016, 7 pgs.

Chen, et al., "Growth-twins in CrN/AlN multilayers induced by hetero-phase interfaces", Acta Materialia 185, Nov. 29, 2019, 14 pgs.

Huang, et al., "Nanotwinned diamond with unprecedented hardness and stability", Nature 510, Jun. 12, 2014, 14 pgs.

Li, et al., "High-Strength Nanotwinned Al Alloys with 9R Phase", Advanced Materials, 2018, 9 pgs.

Lu, et al., "Investigation of nanostructure evolution and twinning of nanocrystallites in Ti-Bx-Ny nanocomposite thin films deposited by magnetron sputtering at low temperature by means of HRTEM and Monte Carlo simulations", Acta Materialia 54, Apr. 19, 2006, 9 pgs.

Murakami, et al., "Quantitative evaluation of effects of non-metallic inclusions on fatigue strength of high strength steels. I: Basic fatigue mechanism and evaluation of correlation between the fatigue fracture stress and the size and location of non-metallic inclusions", Int. J. Fatigue 11, No. 5, 1989, 8 pgs.

Tian, et al., "Ultrahard nanotwinned cubic boron nitride", Nature 493, Jan. 17, 2013, 4 pgs.

Xie, et al., "Atomic-Level Understanding of "Asymmetric Twins" in Boron Carbide", Phys.Rev.Lett. 115, 175501, Oct. 23, 2015, 5 pgs.

Zhang, et al., "Enhanced hardening in Cu/330 stainless steel multilayers by nanoscale twinning", Acta Materialia 52, Oct. 22, 2003, 8 pgs.

* cited by examiner

FORMING NANOTWINNED REGIONS IN A CERAMIC COATING AT A TUNABLE VOLUME FRACTION

CROSS REFERENCE TO RELATED APPLICATIONS

This application is a continuation-in-part and claims priority under 35 U.S.C 120 to PCT Application No. PCT/CN2021/106414, filed Jul. 15, 2021, and entitled "Forming Nanotwinned Regions in a Ceramic Coating at a Tunable Volume Fraction", the disclosure of which is hereby incorporated by reference.

BACKGROUND

The following description relates to formation of nanotwinned regions in a ceramic thin film at a tunable volume fraction.

Lightweight metals, e.g., titanium alloys, have become integral to automotive, aerospace, transportation, and many other industries. Offering the possibility of weight reduction and cost-efficient performance, they can contribute to the increased efficiency, performance, and sustainable manufacture in these industries. Despite their favorable strength-to-weight ratios, lightweight metals tend to have low hardness and exhibit poor resistance to mechanical wear, making surface engineering and advanced coatings essential for the use of lightweight metals in many applications.

DETAILED DESCRIPTION

In some aspects of what is described here, a physical vapor deposition (PVD) system is used to manufacture a ceramic thin film on a surface of a substrate. The ceramic thin film is formed by performing a co-sputtering process of two or more sputtering materials in a processing chamber of the PVD system. The co-sputtering process may be performed in a controlled gas atmosphere at a controlled pressure level. In some implementations, the ceramic thin film containing titanium, boron, and nitrogen is prepared by co-sputtering a titanium metal target and a titanium diboride target in a nitrogen environment. The ceramic thin film from the co-sputtering deposition process has a heterogenous structure in which crystalline grains are imbedded in an amorphous matrix. Each of the crystalline grains includes nanotwinned regions.

In some implementations, the systems and techniques described here can provide technical advantages and improvements. For example, ceramic thin films formed using the methods and systems presented here are deposited on surfaces of parts or components to improve their mechanical properties, e.g., fatigue resistance, fracture toughness, hardness, and other mechanical properties. Volume fractions of nanotwinned regions in ceramic thin films can be tuned in a range of 30%-80% for optimized mechanical properties by tuning deposition conditions (e.g., power, substrate bias, gas composition, substrate temperature, etc.). Formation of ceramic thin films using the methods and systems presented here can be performed under mild conditions, e.g., at a temperature in a range of room temperature to 400 degrees Celsius (° C.) and at a pressure in a range of 0.1-0.35 pascal (Pa). The low-cost process disclosed here dramatically reduces processing time and energy requirement, and allows formation of such ceramic thin films on surfaces of parts or components with complex geometries at an industrial scale. In some cases, a combination of these and potentially other advantages and improvements may be obtained.

Figure 1:
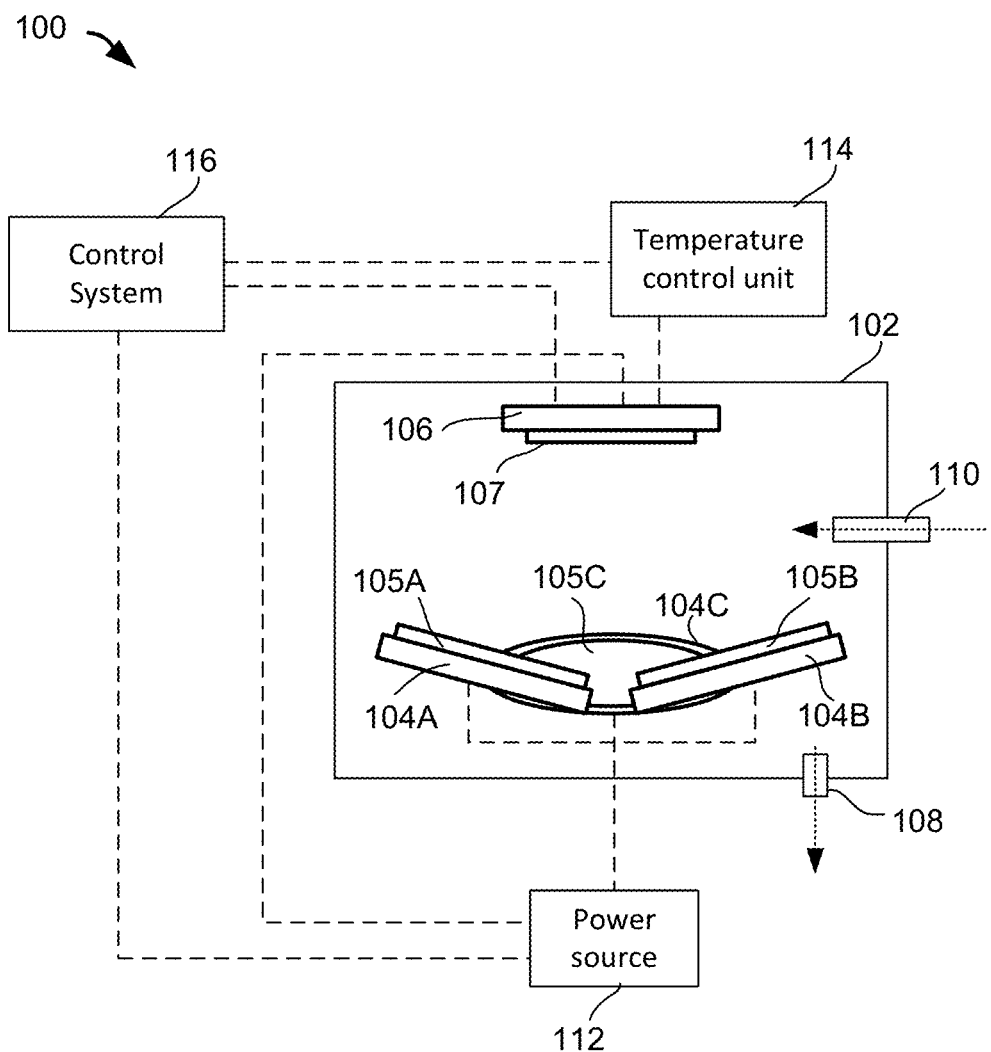
FIG. 1 is a block diagram showing aspects of an example physical vapor deposition (PVD) system.

FIG. 1 is a schematic diagram showing aspects of an example physical vapor deposition (PVD) system 100. The example physical vapor deposition (PVD) system 100 is used for forming heterogenous ceramic thin films. A heterogenous ceramic thin film formed using the example PVD system includes crystalline grains and an amorphous matrix where the crystalline grains are embedded. In some implementations, each of the crystalline grains in a ceramic thin film manufactured using the PVD system 100 includes one or more nanotwinned regions. A nanotwinned region is identified in grain boundaries as a shifted segment of a crystal in which the crystal lattices on each edge are linked across imaginary twin planes by mirror symmetry. The volume fraction of the nanotwinned regions in the ceramic thin film can be tuned by tuning one or more deposition conditions during the manufacturing process. By tuning the volume fraction of the nanotwinned regions in a ceramic thin film, mechanical properties (e.g., fatigue resistance, fracture toughness, hardness, and other properties) of the ceramic thin films can be tuned and optimized.

As shown in FIG. 1, the PVD system 100 includes a processing chamber 102; and the processing chamber 102 includes targets 105 bonded on respective cathodes 104. As shown in the example here, the PVD system 100 includes three targets 105A, 105B, 105C bonded on three respective cathodes 104A, 104B, 104C. In some instances, the processing chamber 102 may include more cathodes 104 bonded with more targets 105 and the cathodes 104 in the processing chamber 102 may be arranged in another manner. In some implementations, the targets 105 contain sputtering materials including transition metals (e.g., titanium Ti, tungsten W, molybdenum Mo, niobium Nb, etc.), metal alloys, transitional-metal borides (e.g., titanium diboride $TiB_2$), transition-metal carbides (e.g., Tungsten monocarbide WC), or other sputtering materials (e.g., carbon C).

As shown in FIG. 1, the processing chamber 102 includes a substrate holder 106 configured to hold a substrate 107 facing the targets 105 during the manufacturing process. The substrate holder 106 in the PVD system 100 is positioned at the center of the processing chamber 102. The substrate holder 106 with the substrate 107 may be loaded into the PVD system 100 through a mechanical transfer arm. In some instances, the substrate holder 106 in the PVD system 100 is equipped with temperature control elements, e.g., a temperature sensor, a heater, or another element. Each of the temperature control elements are communicably coupled to a temperature control unit 114. The temperature control unit 114 can be located within the processing chamber 102, e.g., enclosed in a Faraday shield to protect electronic circuits from RF interference, or outside the processing chamber 102. In certain examples, the targets 105A, 105B, 105C and the corresponding cathodes 104A, 104B, 104C may be cooled by a coolant controlled by the temperature control unit 114.

In some instances, the substrate 107 may include a semiconductor material (e.g., silicon and germanium), a metal (e.g., stainless steel), metal alloy (e.g., titanium alloy), metal oxide (e.g., magnesium oxide), metal nitride, or other materials including group III, group IV, and group V elements. In some instances, the substrate 107 may be crystalline, polycrystalline, or amorphous. In some instances, the substrate 107 may include metal parts or components on which surface treatments for improved mechanical performances are needed.

Each of the cathodes 104A, 104B, 104C in the processing chamber 102 is coupled to a power source 112. In some implementations, the PVD system 100 is a DC magnetron sputtering system configured in a cathode target/anodic shield arrangement. In this case, the power source 112 of the example PVD system 100 connected to each of the cathodes 104A, 104B is a DC discharge power supply. In some instances, the power source 112 is a radio frequency (RF) power source and a respective matching circuit operating at frequencies from a few tens of kilohertz (KHz) to tens of megahertz (MHz). In some instances, other technologies, for example, inductively coupled plasma, electron cyclotron resonance, microwave, or helicon wave, may be integrated with the power source 112 for a creation of high-density discharges for desired deposition properties. By applying electric power on a cathode 104, a plasma, e.g., a gas that contains ionized atoms or molecules, can be formed in a space in the processing chamber 102 near the target 105. In some instances, the substrate holder 106 can be also coupled to the power source 112 in order to attract charged particles in the plasma bombarded off the surface of the target 105 by charged processing gas molecules (e.g., Ark). In some instances, the substrate holder 106 can be coupled to electrical ground.

The example PVD system 100 includes one or more gas-feeding ports 110 for receiving processing gas from one or more respective external gas lines and supplying the processing gas into the processing chamber 102. As shown in FIG. 1, the example PVD system 100 also includes a vacuum port 108 connected to a vacuum line with one or more pressure control units, e.g., a vacuum pump, a pressure gauge, or another unit. In some implementations, the processing gas is supplied to the processing chamber 102 through the one or more gas-feeding ports 110 and pumped out of the processing chamber 102 through the vacuum port 108. The one or more pressure control units are configured to evacuate the processing chamber 102 and create an environment in the processing chamber 102 with a pressure in a range of 0.1-0.35 Pa. In some implementations, the processing gas includes nitrogen ($N_2$), Argon (Ar), or another type of gas. In some other instances, the processing gas may include reactive gas depending on the type of sputtering deposition process and the composition of ceramic thin films. For example, the processing gas may include oxygen ($O_2$), methane ($CH_4$), ethyne ($C_2H_2$), ammonia ($NH_3$), hydrogen sulfide ($H_2S$), or another type of reactive gas. The one or more gas-feeding ports 110 may be located in close proximity to the targets 105 (e.g., behind the cathodes 104).

In certain instances, the processing chamber 102 may be also equipped with a thickness monitor system, e.g., a quartz crystal monitor, a spectroscopic ellipsometer, a reflection high-energy electron diffraction detector (RHEED), or another type of system. In some instances, the processing chamber 102 further includes shutters for respective targets 105, a rotational manipulator, viewports, transfer ports, inductive coils, and another component.

The PVD system 100 can be used for manufacturing a ceramic thin film on the substrate 107. For example, a ceramic thin film can be deposited on the surface of the substrate 107 according to a specified recipe. The recipe specifies parameters used for establishing a proper environment in the processing chamber 102 for depositing a ceramic thin film with desired properties. In some implementations, a recipe specifies one or more of the following parameters: processing gas supplied into the processing chamber 102, a pressure in the processing chamber 102 during deposition, parameters of the electric power (e.g., power, voltage, frequency, etc.) supplied to each of the cathodes 104A, 104B, 104C and/or the substrate holder 106, a temperature of the substrate 107, a deposition time, or another parameter.

As shown in FIG. 1, the temperature control unit 114 and the power source 112 are communicably coupled to a control system 116. In some instances, the control system 116 may include a processor, a memory, and a communication interface to receive user inputs, control the operations of the temperature control unit 114, the power source 112, and another component (e.g., the pressure control unit) of the PVD system 100 for performing operations during the manufacturing process (e.g., the operations with respect to the example process 300 in FIG. 3).

The processor of the control system 116 may be implemented as a general purpose processor, a chip multiprocessor (CMP), a dedicated processor, an embedded processor, a digital signal processor (DSP), a network processor, an input/output (I/O) processor, a media access control (MAC) processor, a radio baseband processor, a co-processor, a microprocessor such as a complex instruction set computer (CISC) microprocessor, a reduced instruction set computing (RISC) microprocessor, a very long instruction word (VLIW) microprocessor, or other processing device. The processor may be also implemented by a controller, a microcontroller, an application specific integrated circuit (ASIC), a field programmable gate array (FPGA), a programmable logic device (PLD), or another device.

The memory of the control system 116 may include machine-readable or computer-readable media capable of storing data, including both volatile/non-volatile memory and removable/non-removable memory. The memory may include at least one non-volatile memory unit. The non-volatile memory unit is capable of storing one or more software programs. The software programs may contain, for example, applications, user data, device data, and/or configuration data, or another type of data.

In certain examples, the memory may include read-only memory (ROM), random-access memory (RAM), dynamic RAM (DRAM), Double-Data-Rate DRAM (DDR-RAM), synchronous DRAM (SDRAM), static RAM (SRAM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, disk memory (e.g., floppy disk, hard drive, optical disk, magnetic disk), or card (e.g., magnetic card, optical card), or any other types of media suitable for storing information. In some instances, at least one non-transitory computer-readable storage medium is included in the memory having computer-executable instructions, which, when executed by a processor, cause the processor to perform a manufacturing process (e.g., the example process 300 in FIG. 3).

In some examples, the communication interface of the control system 116 may include a suitable mechanism or component to at least enable a user to provide input to the control system 116 and the control system 116 to provide output to the user. For example, the communication interface may include a button, a keypad, a keyboard, a click wheel, a touch screen, or a motion sensor. In some instances, the communication interface may include a visual peripheral output device for providing a display visible to the user. For example, the visual peripheral output device includes a screen such as, for example, a Liquid Crystal Display (LCD) screen, incorporated into the control system 116 of the PVD system 100. In some instances, the visual peripheral output device can include a coder/decoder, also known as a Codec, to convert digital media data into analog signals. For example, the visual peripheral output device may comprise video Codecs, audio Codecs, or any other suitable type of Codec.

In certain examples, the communications interface may comprise any suitable hardware, software, or combination of hardware and software that is capable of coupling the temperature control unit 114 and the power source 112 to the control-system 116. The communications interface may be arranged to operate with any suitable technique for controlling information signals using a desired set of communications protocols, services, or operating procedures. The communications interface may comprise the appropriate physical connectors to connect with a corresponding communications medium, e.g., wired or wireless.

Figure 2:
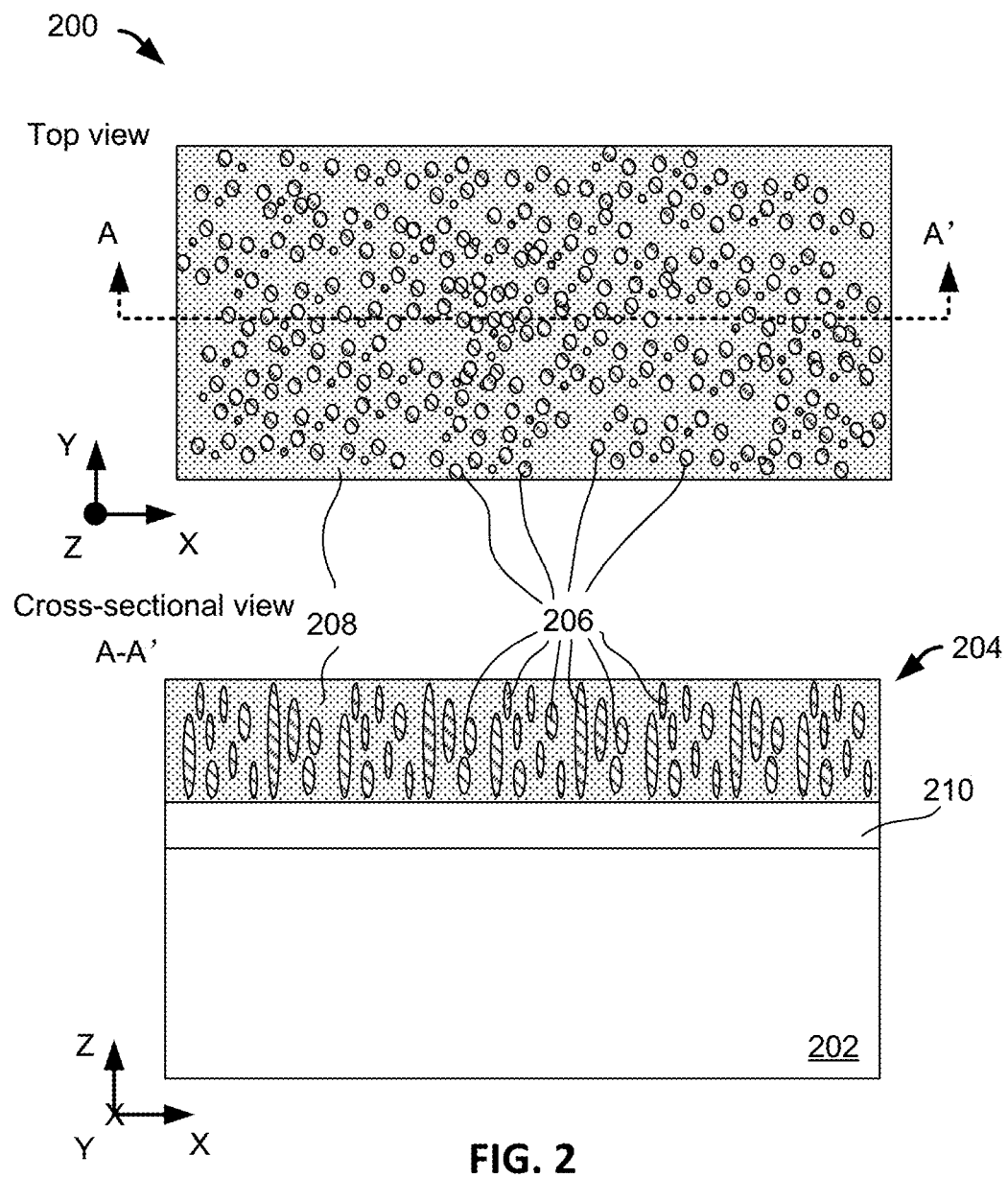
FIG. 2 are schematic diagrams showing top-view and cross-sectional view of an example device.

FIG. 2 is schematic diagrams showing top-view and cross-sectional view of an example device 200. The example device 200 includes a substrate 202, an interlayer 210, and a ceramic thin film 204. The substrate 202 may be implemented as the substrate 107 as shown in FIG. 1 or in another manner. In some instances, the substrate 202 may be a mechanical component or part of a tool in a wide variety of industrial applications. In some instances, the ceramic thin film 204 may be used to improve the mechanical performance of the substrate 202. For example, the ceramic thin film 204 may be used to improve the hardness of the substrate 202, improve the lifetime of the substrate 202, improve the wear resistance of the substrate 202, or for another purpose. In some implementations, the ceramic thin film 204 is formed on the substrate 202 using a PVD system, e.g., the PVD system 100 shown in FIG. 1 or in another manner. As shown in FIG. 2, the ceramic thin film 204 has a heterogenous structure including crystalline grains 206 embedded in an amorphous matrix 208. The heterogeneous structure and mechanical properties of the ceramic thin film 204 can be manipulated by tuning deposition conditions of a manufacturing process, e.g., the example process 300 shown in FIG. 3 or in another manner.

In some implementations, an interlayer 210 includes Ti metal or another type of material. The interlayer 210 may be formed on the surface of the substrate 202 to improve the bonding or adhesion of the ceramic thin film 204 on the substrate 202. In some implementations, an interlayer 210 can be formed using the PVD system prior to a co-sputtering deposition of the ceramic thin film 204. An interlayer 210 may have a thickness in a range of 10-150 nm.

In the example device 200 shown in FIG. 2, each of the crystalline grains 206 is extended along the growth direction of the ceramic thin film 204 (e.g., a length direction along the Z axis). In some other instances, each of the crystalline grains 206 may be extended in a direction relative the growth direction of the ceramic thin film by a small offset (e.g., 1 degree, 5 degree, 10 degrees, or another value). As shown in FIG. 2, each of the crystalline grains 206 is an elongated particle having a dimension (e.g., along the Z axis) greater than the other two dimensions (e.g., a width direction in the X-Y plane). In some instances, the width of the crystalline grains 206 in a ceramic thin film 204 is in a range of 3-30 nanometers (nm), 8-16 nm, or another range. In some implementations, the ceramic thin film 204 has a thickness in a range of greater than 400 nm, greater than 1000 nm, greater than 2000 nm, or another range. In some implementations, each of the crystalline grains 206 and the amorphous matrix 208 in the ceramic thin film 204 includes one or more transition metals, boron, and nitrogen. For example, a transition metal in the ceramic thin film 204 is titanium (Ti). In some implementations, a boron concentration in the ceramic thin film 204 is in a range of 2-18 atomic percent.

In some implementations, one or more of the crystalline grains 206 in the ceramic thin film 204 includes nanotwinned regions. In some instances, a nanotwinned region in a crystalline grain 206 is identified in grain boundaries as a shifted segment of a crystal in which the crystal lattices on each edge are linked across imaginary twin planes by mirror symmetry. A volume fraction of the nanotwinned regions in the ceramic thin film 204 is in a range of 30-80%. In some implementations, a twin spacing in each of the one or more nanotwinned regions in a crystalline grain is in a range of 0.35-0.65 nanometers or in another range.

Figure 3:
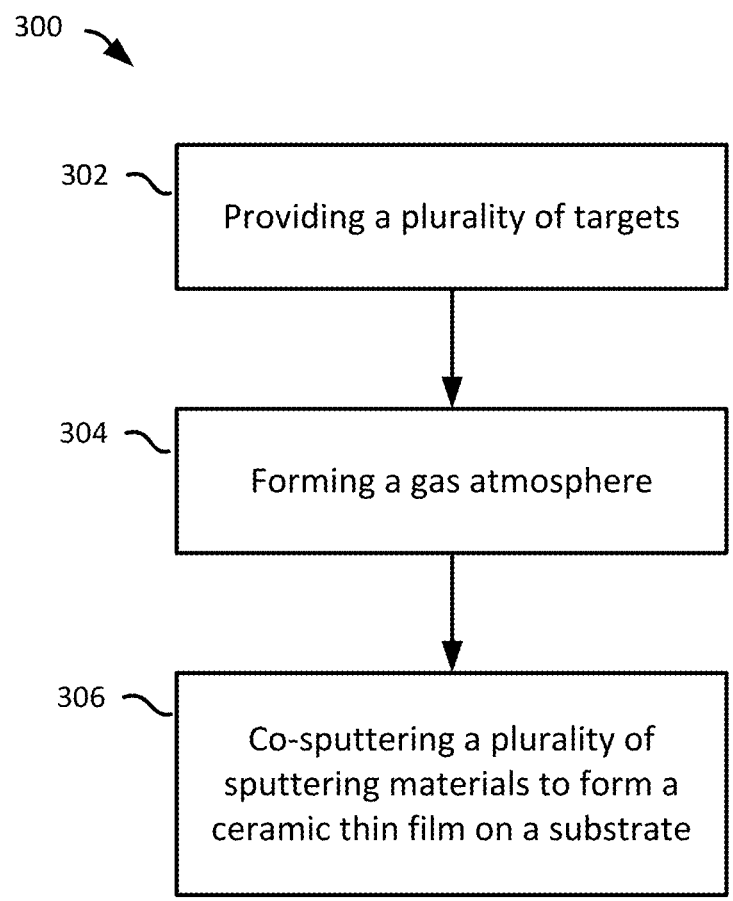
FIG. 3 is a flow diagram showing aspects of an example process.

FIG. 3 is a flow diagram showing aspects of an example manufacturing process 300. Aspects of the example manufacturing process 300 can be performed in a PVD system, e.g., the PVD system 100 shown in FIG. 1 or in another system. The example manufacturing process 300 can be used for forming a ceramic thin film, e.g., the ceramic thin film 204 shown in FIG. 2, or for manufacturing a device, e.g., the device 200 shown in FIG. 2. The example process 300 may include additional or different operations, and the operations may be performed in the order shown or in another order. In some cases, operations in the example process 300 can be combined, iterated or otherwise repeated, or performed in another manner.

At 302, two or more targets are provided. In some instances, the two or more targets (e.g., the targets 105 in FIG. 1) are bonded on respective cathodes (e.g., the cathodes 104 in FIG. 1) in the PVD system (e.g., the PVD system 100 in FIG. 1). In some instances, the two or more targets include one titanium metal target, and one titanium diboride target. In some instances, the titanium metal target is a high-purity titanium target (99.95%). In some instance, each of the respective cathodes are electrically coupled to a power source (e.g., the power source 112 in FIG. 1), which can tune electric power applied to the two or more targets. In some implementations, the power source is a DC power source, which supplies DC power to the two or more targets in the PVD system.

In some implementations, one or more substrates are loaded on to a substrate holder (e.g., the substrate holder 106 in FIG. 1) in a processing chamber (e.g., the processing chamber 102 in FIG. 1) of the PVD system. The one or more substrates are configured on the substrate holder facing the targets. Each of the one or more substrates may be implemented as the substrate 107 as shown in FIG. 1.

At 304, a gas atmosphere is formed. In some implementations, the gas atmosphere is formed in the processing chamber of the PVD system. In some implementations, the gas atmosphere includes a mixture of Ar and $N_2$. In some implementations, a $N_2$ fraction in the gas atmosphere is about 20%. During co-sputtering deposition, a flow rate of Ar is 20 sccm (standard cubic centimeter per minute); and a flow rate of $N_2$ is 5 sccm. The flow rates are maintained in the processing chamber during the co-sputtering deposition. The processing chamber is evacuated, for example, by operation of a pressure control unit; and the gas atmosphere in the processing chamber is maintained at a pressure of 0.2 Pa during the co-deposition process.

At 306, sputtering materials from the two or more targets are co-sputtered. In some implementations, the substrate can be heated. For example, the temperature of the substrate during the co-sputtering deposition can be maintained at a temperature that is equal to or less than 400 degrees Celsius, e.g., by operation of the temperature control unit 114 in FIG. 1. In some implementations, no heating or cooling is applied to the substrate during the co-sputtering deposition.

Electric power is applied, by operation of the power source 112 in FIG. 1, on the two or more targets to cause co-sputtering. For example, when a ceramic thin film containing titanium boron nitride, 450-watt DC power is applied on the high-purity titanium metal target and DC power in a range of 50-200 watt is applied on the titanium diboride target. In some implementations, a substrate biasing voltage is applied on the substrate holder during the co-sputtering deposition. In some instances, the substrate biasing voltage is in a range of −50 to −130 volt. Under these deposition conditions, a deposition rate in a range of 0.1-0.8 nanometers per second (nm s$^{-1}$) is used for depositing the ceramic thin film on the surface of the substrate. Depending on the deposition rate, a deposition time is tuned such that a thickness of the ceramic thin film deposited on the surface of the substrate is equal to or greater than 400 nanometers.

In some implementations, prior to the co-sputtering deposition of the ceramic thin film, an interlayer can be formed on the surface of the substrate to improve adhesion between the ceramic thin film and the surface of the substrate. For example, a titanium metal interlayer can be deposited on the surface of the substrate by performing a sputtering deposition process. For example, 450-watt DC power can be applied on the high-purity titanium metal target with a substrate biasing voltage of −110 V at a working pressure of 0.2 Pa in a gas atmosphere consisting of Argon. After the formation of the interlayer on the surface of the substrate, the co-sputtering deposition is performed, during which the ceramic thin film can be subsequently formed on the interlayer.

Figure 4A:
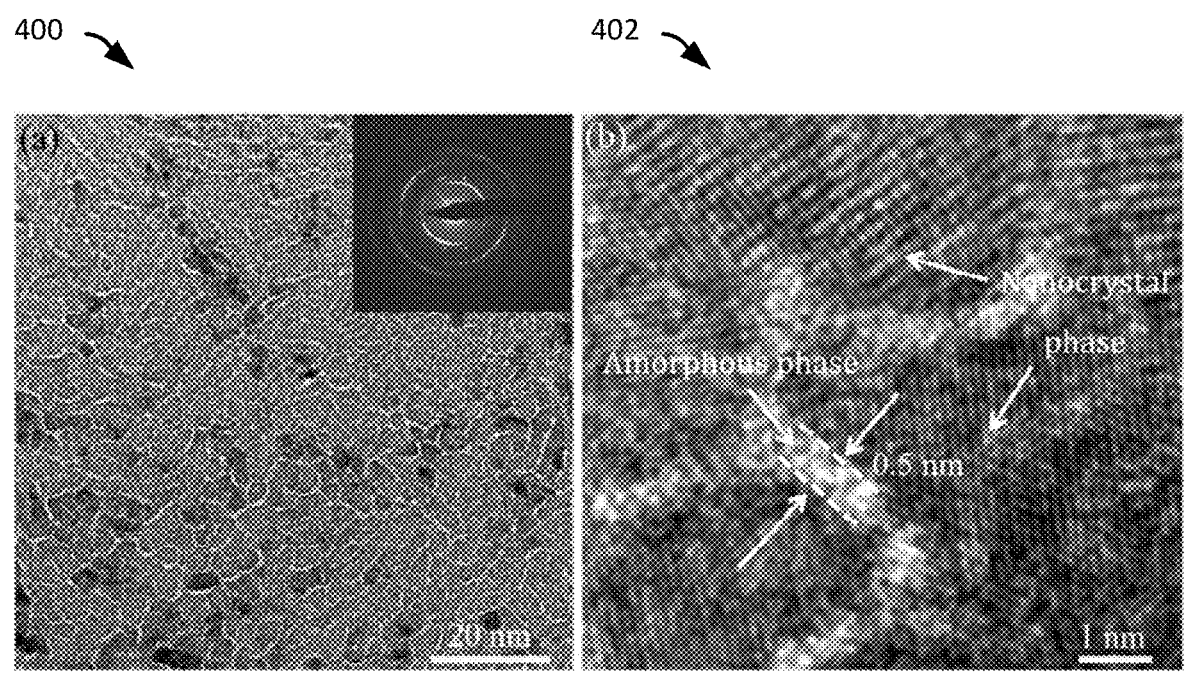
FIG. 4A are in-plane transmission electron microscopic (TEM) images showing aspects of an example ceramic thin film.
Figure 4B:
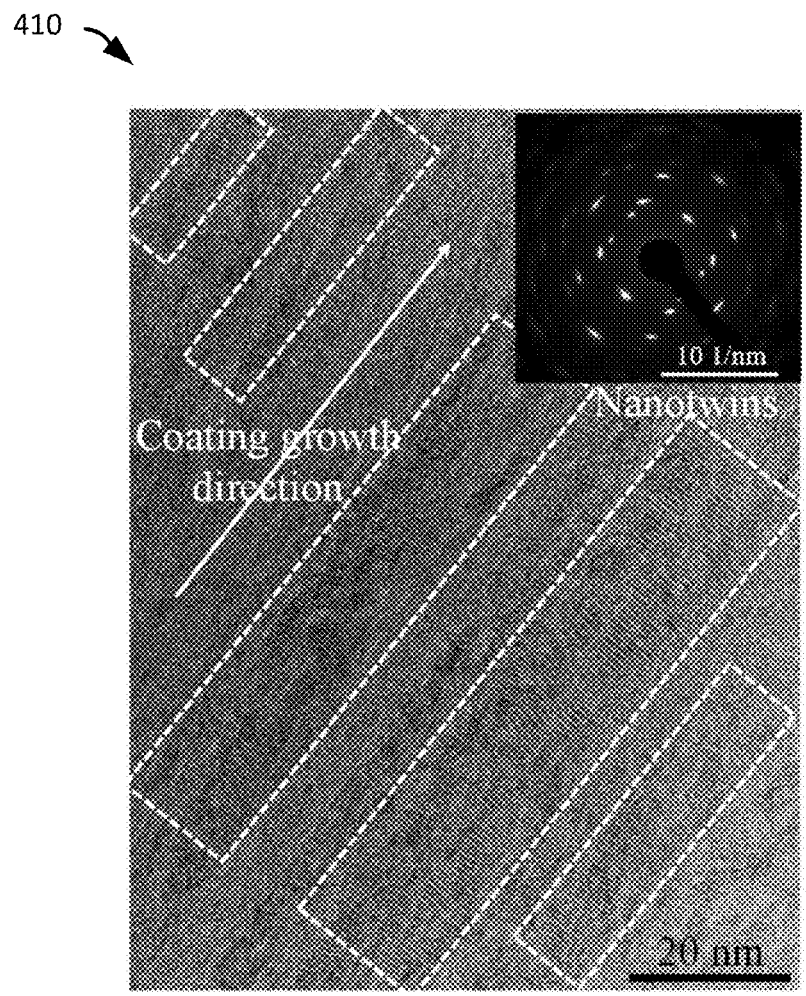
FIG. 4B is a cross-sectional TEM image showing aspects of the example ceramic thin film shown in FIG. 4A.
Figure 4C:
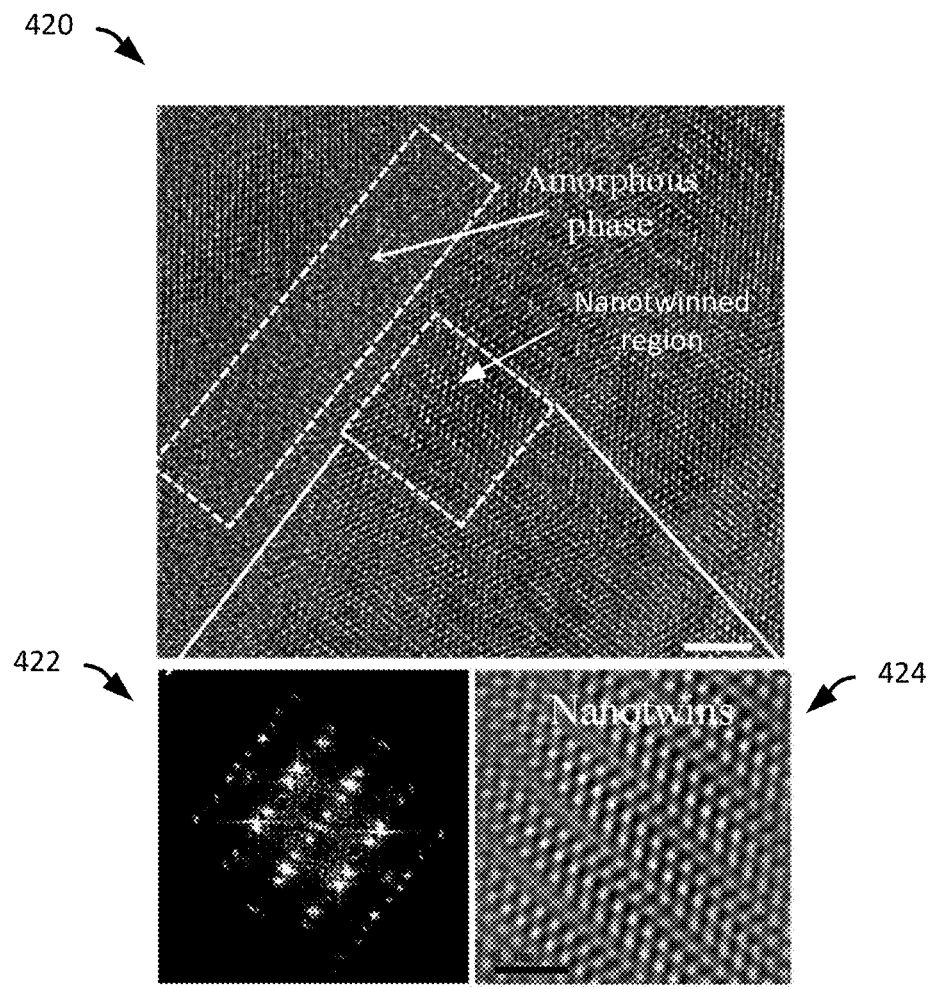
FIG. 4C shows a cross-sectional high-resolution TEM (HRTEM) image of the example ceramic thin film shown in FIG. 4B, a Fast Fourier Transform (FFT) pattern of a nanotwinned region in the example ceramic thin film, and a corresponding inversed FFT (IFFT) image.

FIG. 4A are in-plane transmission electron microscopic (TEM) images 400, 402 showing aspects of an example ceramic thin film. FIG. 4B is a cross-sectional TEM image 410 showing aspects of the example ceramic thin film shown in FIG. 4A. FIG. 4C shows a cross-sectional high-resolution TEM (HRTEM) image 420 of the example ceramic thin film shown in FIG. 4B, a Fast Fourier Transform (FFT) pattern 422 of a nanotwinned region, and a corresponding inversed FFT (IFFT) image 424. The example ceramic thin film is deposited by performing a co-sputtering deposition of Ti metal and $TiB_2$ on a single crystal silicon substrate, as described in the example manufacturing process 300 in FIG. 3. Particularly, first electrical power supplied on a Ti target is equal to 450 Watt (W) and second electrical power supplied on a $TiB_2$ target is equal to 80 W. The silicon substrate on a substrate holder is supported on a substrate holder without intentional heating during the co-sputtering deposition and a substrate biasing voltage of −110 V is applied on the substrate holder. Nitrogen gas ($N_2$) and argon gas (Ar) was supplied into the processing chamber at a flow rate of 5 sccm and 20 sccm, respectively. The working pressure in the processing chamber during the deposition process was maintained at 0.2 Pa.

Prior to characterizing the example ceramic thin film using TEM, the device including the ceramic thin film on the silicon substrate is cut along the X-Y plane and in a direction normal to the X-Y plane (e.g., X-Z plane) using focused ion beam (FIB). As shown in the in-plane TEM image 400 in FIG. 4A, the ceramic thin film includes nanocrystals embedded in an amorphous matrix. The nanocrystals are embedded in the amorphous matrix uniformly at random. The width of the nanocrystals in the X-Y plane is in a range of 8-16 nm. The twin boundary is perpendicular to the growth direction of the film, and the middle of the two twin crystal phase regions is an amorphous phase. The illustration in the upper right corner is the result of FFT. Spots in the FFT pattern show the presence of twins. This corresponds to the observation of the surface TEM sample. The nanotwinned regions can be observed in crystalline grains that are embedded in the amorphous matrix. In some instances, the nanotwinned regions are surrounded by or embedded in the amorphous matrix.

As shown in the cross-sectional HRTEM image 420, the FFT pattern 422, and the inverse FFT image 424 corresponding to the box in the cross-sectional HRTEM image 420 show the existence of nanotwinned regions and the atomic arrangement between two neighboring nanotwins. The thickness of the nanotwins is about 2-3 atomic layers, or in a range of 0.35-0.65 nanometers.

Figure 5:
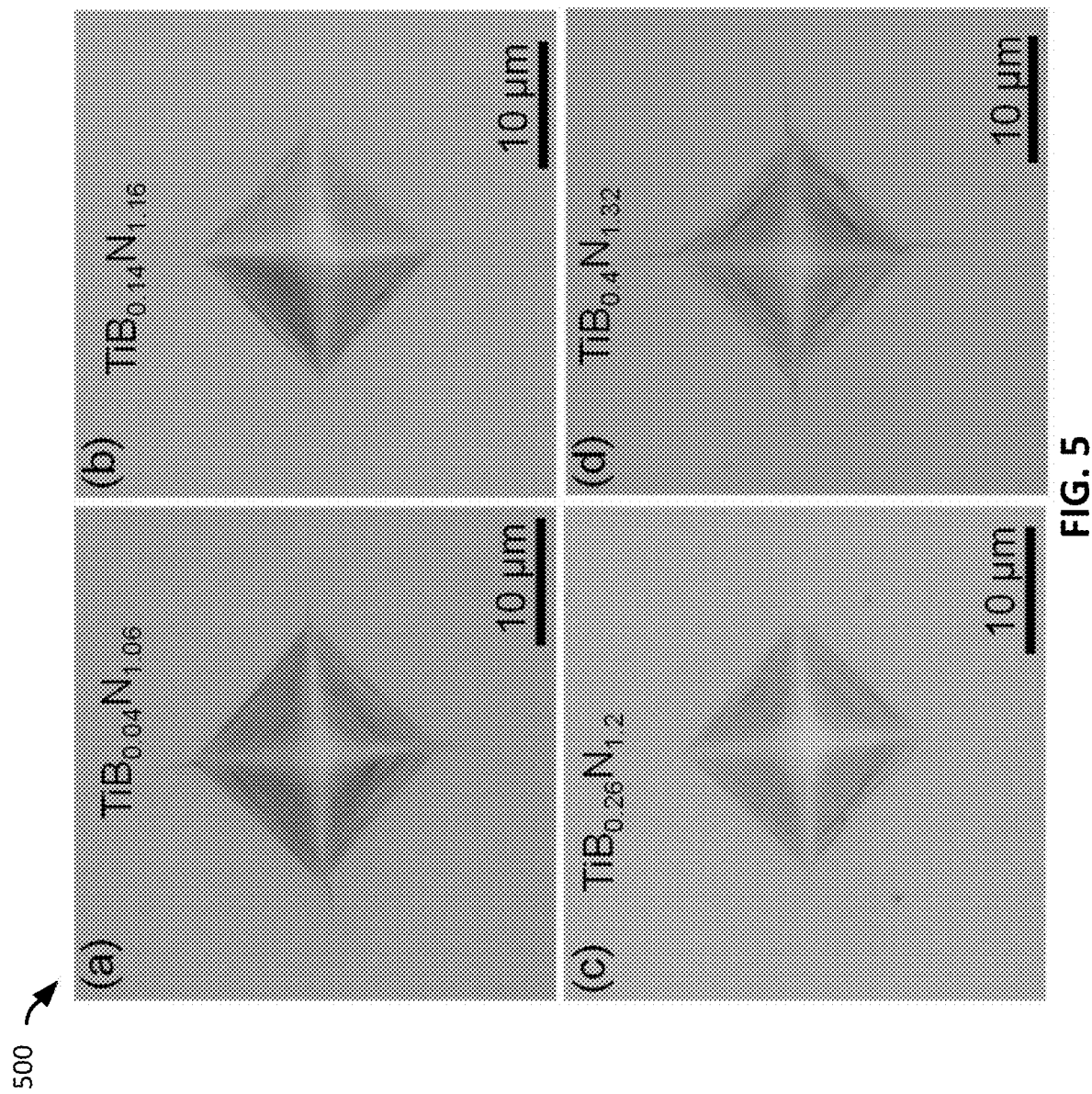
FIG. 5 are optical microscopic images of surfaces on various ceramic thin films after performing hardness tests.

FIG. 5 are optical microscopic images 500 of surfaces on various ceramic thin films after performing hardness tests. The ceramic thin films are prepared using a physical vapor deposition system (e.g., the physical vapor deposition system 100 shown in FIG. 1) by performing operations with respect to the example manufacturing process 300 shown in FIG. 3. Each of the example ceramic thin films was deposited on a single crystalline silicon substrate without intentional heating at a constant substrate biasing voltage of −110 V. The ceramic thin films were prepared on the silicon substrates by co-sputtering of a Ti target at a constant DC power of 450 W and a $TiB_2$ target at various DC powers, e.g., 50 W, 80 W, 120 W, and 200 W. All the ceramic thin films prepared here have the same thickness of about 2 micrometer (μm). Toughness of the ceramic thin films were then tested using a Vickers hardness test method. As shown in FIG. 5, residual imprints were observed on all the surface of the ceramic thin films. The ceramic thin film deposited with the DC power of 80 W and 120 W applied on the $TiB_2$ target showed no cracks extending at the corners of the residual imprints indicating higher toughness than the ceramic thin films that are prepared at other DC power values.

Figure 6A:
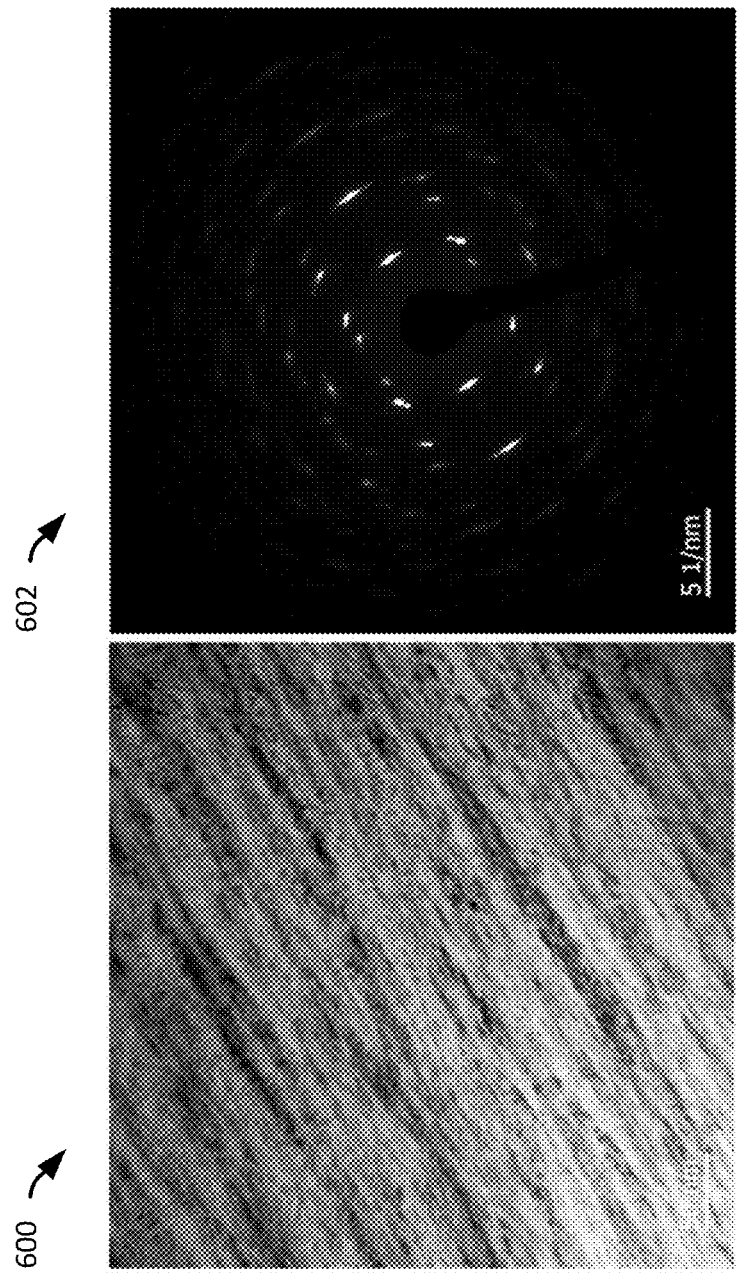
FIGS. 6A-6E are cross-sectional TEM images and corresponding SAED patterns of various ceramic thin films.
Figure 6B:
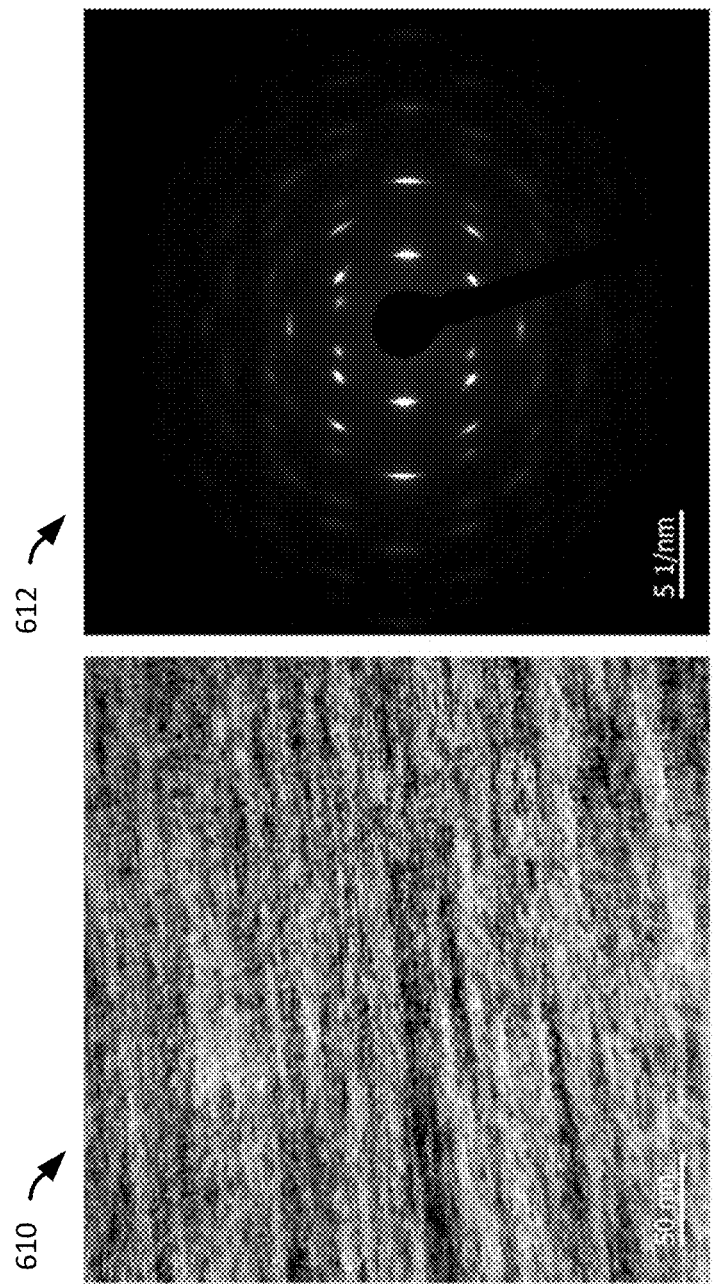
Figure 6C:
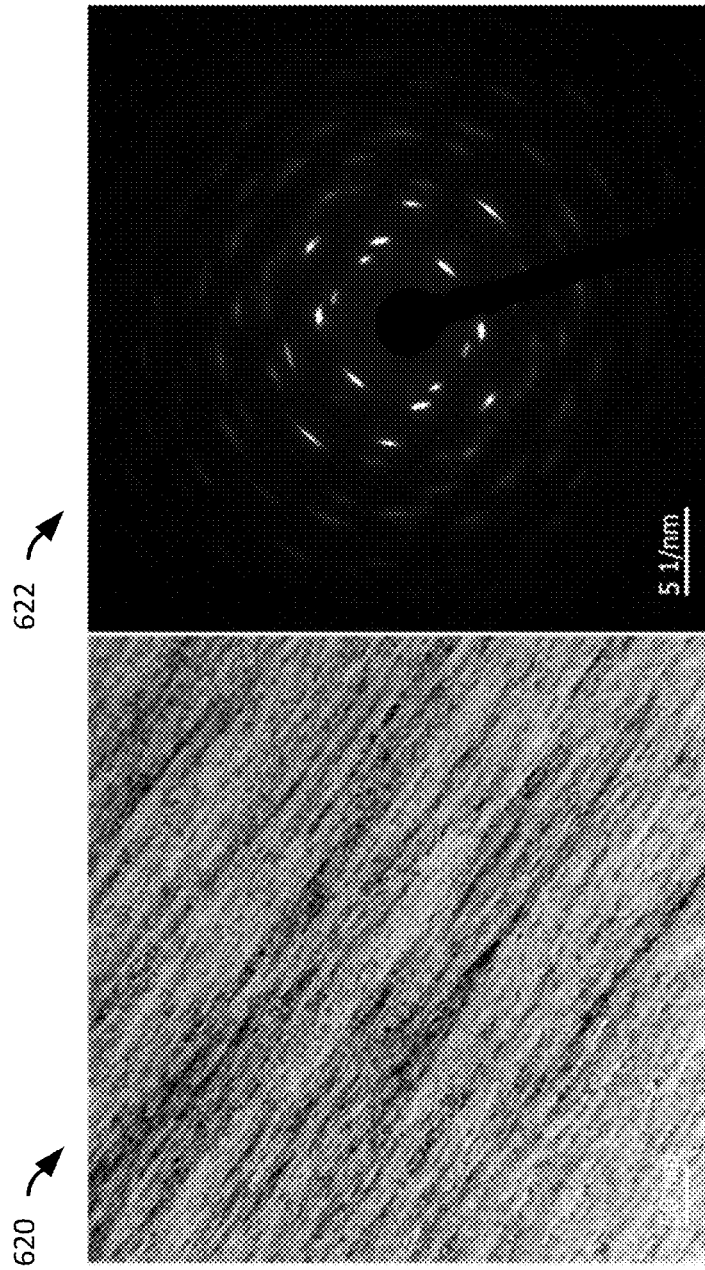
Figure 6D:
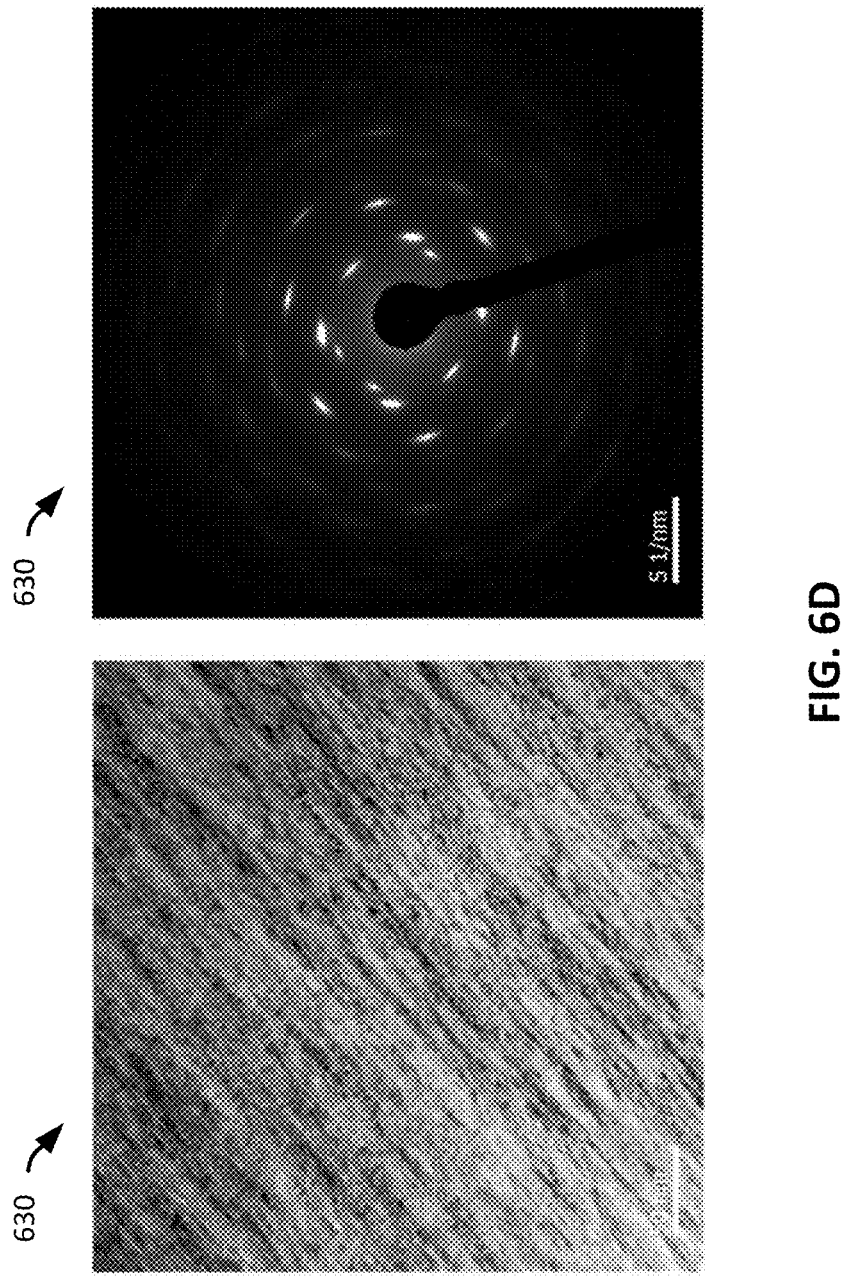
Figure 6E:
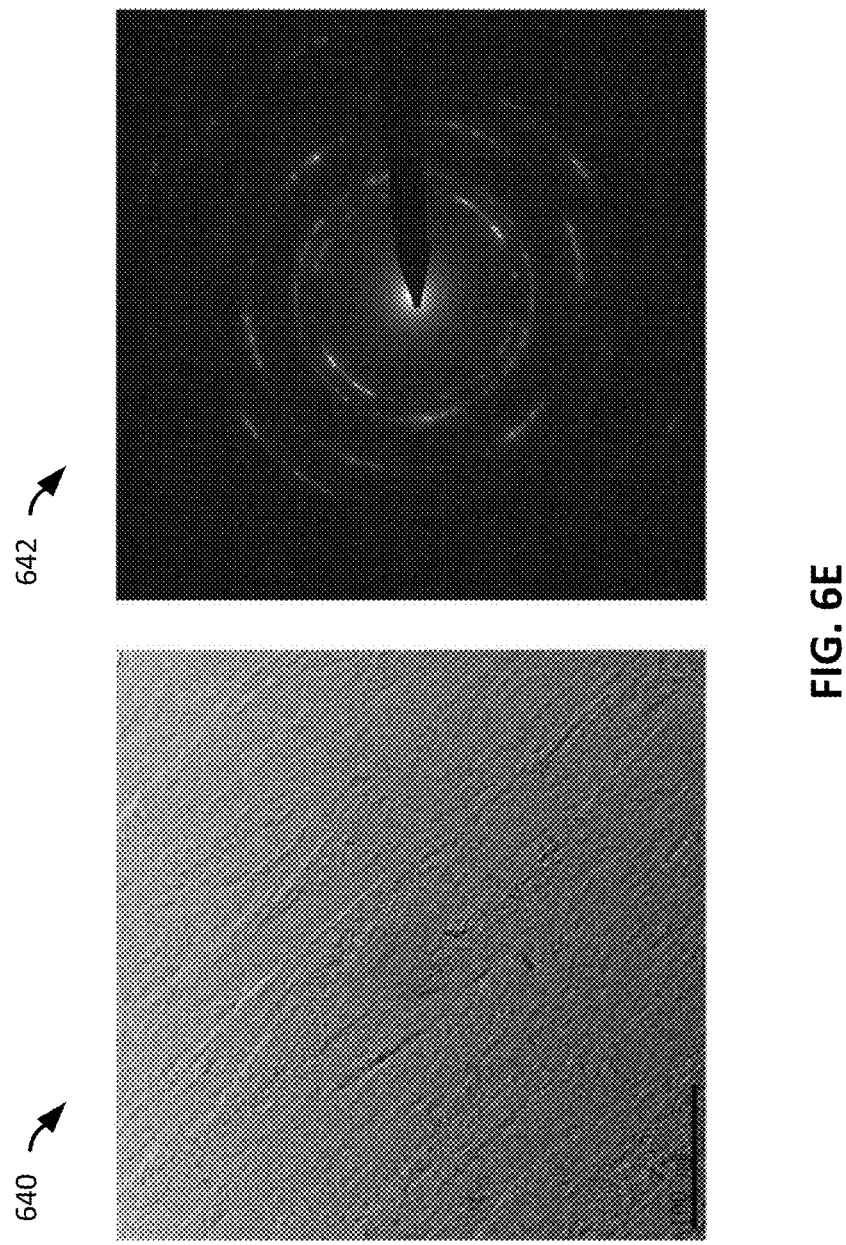

FIGS. 6A-6E are cross-sectional TEM images 600, 610, 620, 630, 640 and corresponding selected area diffraction (SAED) patterns 602, 612, 622, 632, 642 of the various ceramic thin films shown in FIG. 5. Each of the example ceramic thin films was deposited on a single crystalline silicon substrate without intentional heating at a constant substrate biasing voltage of −110V. The ceramic thin films were prepared on the silicon substrates by co-sputtering of Ti at a constant DC power value of 450 W and $TiB_2$ at various DC power values, e.g., 50 W (FIG. 6A), 80 W (FIG. 6B), 120 W (FIG. 6C), 160 W (FIG. 6D), and 200 W (FIG. 6E). The thickness of all the ceramic thin films is about 2 μm.

Atomic ratios (Ti:B:N) in the ceramic thin films were determined by performing an energy dispersive spectroscopy analysis (EDS) equipped in the TEM instrument. Particularly, the atomic ratio (Ti:B:N) of a first ceramic thin film deposited at the DC power of 50 W applied on the $TiB_2$ target is determined as 1:0.04:1.06. The cross-sectional morphology and corresponding SAD pattern of the first ceramic thin film are shown in FIG. 6A. The atomic ratio of B in the first ceramic thin film is about 1.9%. The volume fraction of nanotwin regions in the first ceramic thin film is about 45%. The hardness of the first ceramic thin film is about 43.2 GPa.

The atomic ratio (Ti:B:N) of a second ceramic thin film deposited at the DC power of 80 W applied on the $TiB_2$ target is determined as 1:0.14:1.16. The cross-sectional morphology of the second ceramic thin film and the corresponding SAED pattern are shown in FIG. 6B. The atomic ratio of B in the second ceramic thin film is about 6.0%. The volume fraction of nanotwinned regions in the second ceramic thin film is about 65%. The hardness of the second ceramic thin film is about 41.5 GPa.

The atomic ratio (Ti:B:N) of a third ceramic thin film deposited at the DC power of 120 W applied on the $TiB_2$ target is determined as 1:0.26:1.20. The cross-sectional morphology of the third ceramic thin film and the corresponding SAD pattern are shown in FIG. 6C. The atomic ratio of B in the third ceramic thin film is about 10.6%. The volume fraction of nanotwinned regions in the third ceramic thin film is about 55%. The hardness of the third ceramic thin film is about 38.8 GPa.

The atomic ratio (Ti:B:N) of a fourth ceramic thin film deposited at the DC power of 160 W applied on the $TiB_2$ target is determined as 1:0.31:1.19. The cross-sectional morphology of the fourth ceramic thin film and the corresponding SAED pattern are shown in FIG. 6D. The atomic ratio of B in the fourth ceramic thin film is about 12.4%. The volume fraction of nanotwinned regions in the fourth ceramic thin film is about 42%. The hardness of the fourth ceramic thin film is about 35.9 GPa.

The atomic ratio (Ti:B:N) of a fifth ceramic thin film deposited at the DC power of 200 W applied on the $TiB_2$ target is determined as 1:0.40:1.32. The cross-sectional morphology of the fifth ceramic thin film and the corresponding SAED pattern are shown in FIG. 6E. The atomic ratio of B in the fifth ceramic thin film is 14.7%. As shown in the cross-section TEM image 640 in FIG. 6E, no nanotwinned regions are observable in the fifth ceramic thin film. The hardness of the fifth ceramic thin film is about 33.1 GPa.

Figure 7A:
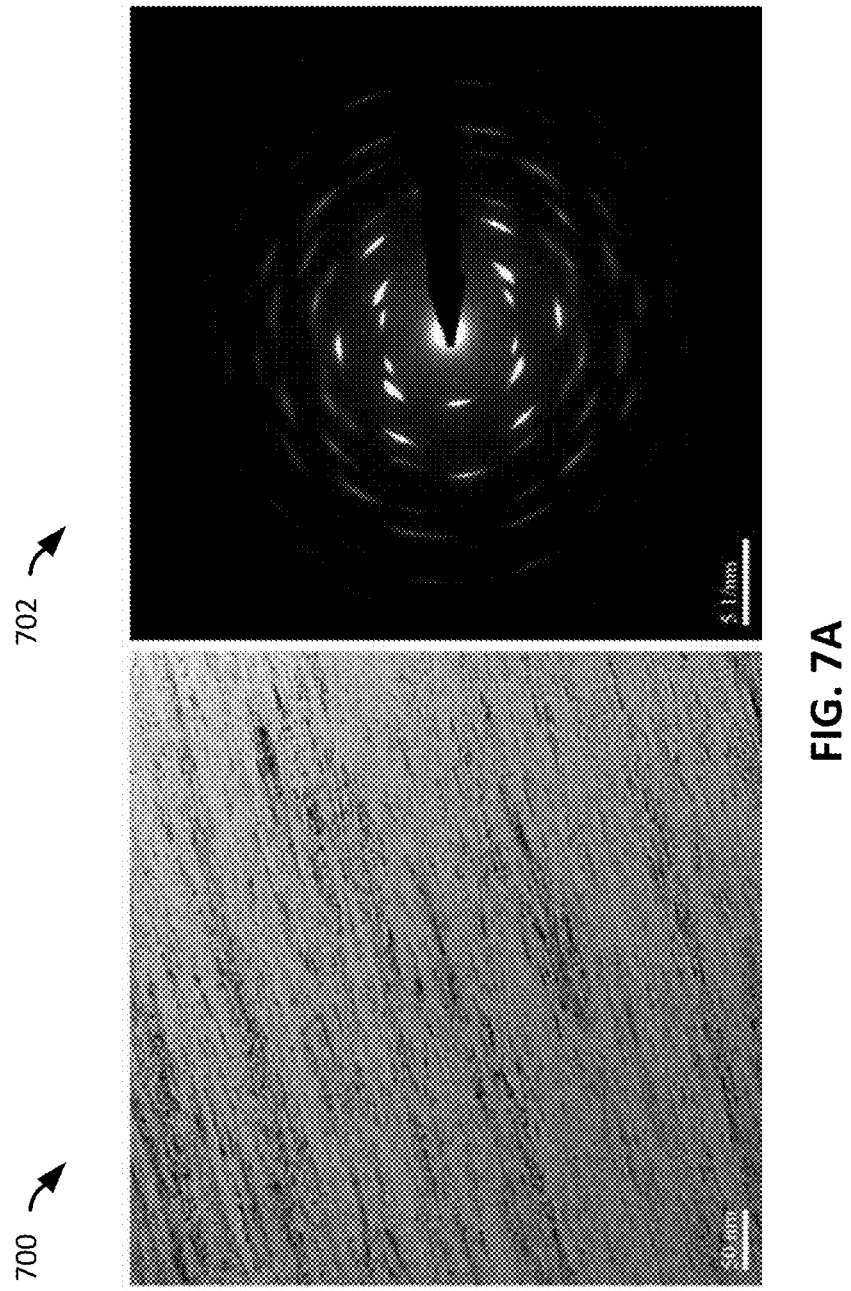
FIG. 7A are a cross-sectional TEM image and a corresponding SAED pattern of a ceramic thin film deposited on a single crystalline MgO (111) substrate.
Figure 7B:
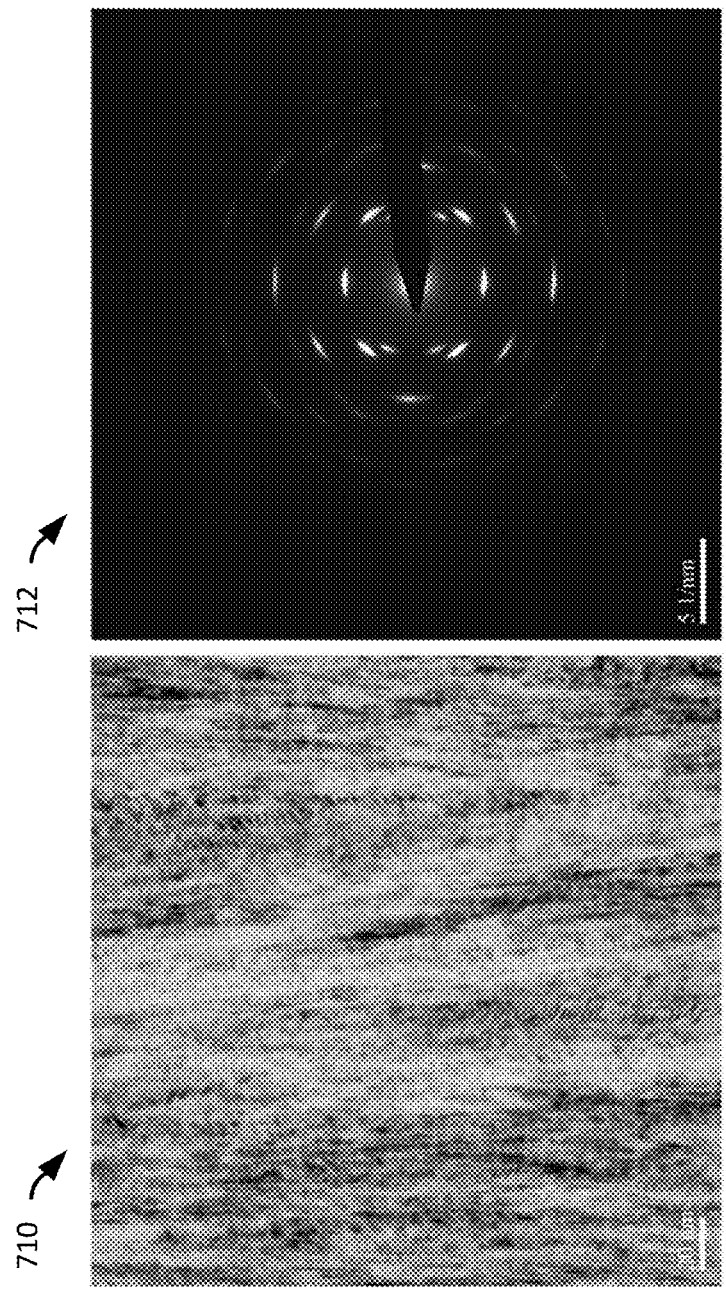
FIG. 7B are a cross-sectional TEM image and a corresponding SAED pattern of a ceramic thin film deposited on a titanium alloy substrate.

FIGS. 7A-7B are cross-sectional TEM images 700, 710 and corresponding SAD patterns 702, 712 of ceramic thin films deposited on a single crystalline MgO (111) substrate (FIG. 7A) and a Titanium alloy substrate (FIG. 7B). The ceramic thin films were prepared using a physical vapor deposition (PVD) system (e.g., the physical vapor deposition system 100 shown in FIG. 1) by performing operations with respect to the example manufacturing process 300 shown in FIG. 3. Specifically, the ceramic thin films were co-sputtered by using a high purity Ti target (99.99%) and a $TiB_2$ target in a JCP500 PVD sputtering system. Depositions of all the ceramic thin films were performed at a constant substrate temperature of 400° C. and under a constant substrate biasing voltage of −110 V. The co-sputtering depositions were performed in a gas atmosphere including an Ar/$N_2$ gas mixture at a flow rate ratio of 20 sccm (Ar)/5 sccm ($N_2$). The gas atmosphere in the processing chamber was maintained at a pressure of 0.2 Pa during the co-sputtering deposition processes. DC electrical power applied on the Ti target and $TiB_2$ target were set at constant values of 450 W and 80 W, respectively. The titanium alloy substrate is a Ti6-Al4-V substrate.

Atomic ratios (Ti:B:N) in the ceramic thin films were determined by performing an energy dispersive spectroscopy analysis (EDS) equipped in the TEM instrument. The atomic ratio (Ti:B:N) of the ceramic thin film on the single crystalline MgO (111) substrate is determined as 1:0.12:1.18. The atomic ratio of B in the ceramic thin film on the single crystalline MgO (111) substrate is about 5.2%. The volume fraction of nanotwinned regions in the ceramic thin film on the single crystalline MgO (111) substrate is about 60.8%. The hardness of the ceramic thin film on the single crystalline MgO (111) substrate is about 41.9 GPa.

The atomic ratio (Ti:B:N) of the ceramic thin film on the titanium alloy substrate is determined as 1:0.12:1.18. The atomic ratio of B in the ceramic thin film on the titanium alloy substrate is 5.8%. The volume fraction of nanotwinned regions in the ceramic thin film on the titanium alloy substrate is about 63.6%. The hardness of the ceramic thin film on the titanium alloy substrate is about 40.9 GPa.

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer storage medium for execution by, or to control the operation of, data-processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media.

Some of the operations described in this specification can be implemented as operations performed by a data processing apparatus on data stored on one or more computer-readable storage devices or received from other sources.

The term "data-processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

In a general aspect of what is described above, manufacturing a ceramic thin film with nanotwinned regions is disclosed.

In a first example, a method for manufacturing a ceramic thin film on a surface of a substrate in an evacuated chamber is disclosed. The ceramic thin film includes crystalline grains; and each of the crystalline grains includes one or more nanotwinned regions. The one or more nanotwinned regions have a volume fraction in a range of 30-80% of the ceramic thin film. A plurality of targets including a plurality of sputtering materials is prepared. A gas atmosphere in the evacuated chamber is formed. Electric power is supplied to the plurality of targets to cause co-sputtering of the plurality of sputtering materials to form the ceramic thin film with the one or more nanotwinned regions.

Implementations of the first example may include one or more of the following features. The substrate includes one of stainless steel, metal alloy, silicon, or magnesium oxide. The substrate includes a titanium alloy. The plurality of targets includes a first target and a second target. The first target includes titanium metal; and the second target includes titanium boride. The gas atmosphere includes nitrogen. The ceramic thin film includes titanium, nitrogen, and boron. The crystalline grains in the ceramic thin film are embedded in an amorphous matrix. The crystalline grains and the amorphous matrix include titanium, boron, and nitrogen. The gas atmosphere further includes argon; and a nitrogen fraction in the gas atmosphere is about 20%. A boron concentration of the ceramic thin film is in a range of 2-18 atomic percent. A dimension of each of the crystalline grains is in a range of 8-16 nanometers. A twin spacing in each of the one or more nanotwinned regions is in a range of 0.35-0.65 nanometers.

Implementations of the first example may include one or more of the following features. The plurality of sputtering materials is co-sputtered on the surface of the substrate at a deposition rate in a range of 0.1-0.8 nanometers per second. A thickness of the ceramic thin film is equal to or greater than 400 nanometers. A substrate bias in a range of −130 to −50 volt is applied on the substrate. The plurality of sputtering materials is co-sputtered on the surface of the substrate at a temperature, which is equal to or less than 400 degrees Celsius. The plurality of sputtering materials is co-sputtered without applying heating or cooling to the substrate. When the electrical power is supplied, first DC power is applied on the first target; and second DC power is applied on the second target. The first DC power is equal to 450 watt and the second DC power is in a range of 50-200 watt. Before the electric power is supplied to the plurality of targets, an interlayer is formed on the surface of the substrate; and the ceramic thin film is formed by co-sputtering the plurality of sputtering materials on the interlayer.

In a second example, a method of manufacturing a ceramic thin film on a surface of a substrate in an evacuated chamber is disclosed. The ceramic thin film includes crystalline grains. Each of the crystalline grains includes one or more nanotwinned regions. A plurality of targets including a plurality of sputtering materials is provided. A gas atmosphere is formed in the evacuated chamber. Electric power is supplied to the plurality of targets to cause co-sputtering of the plurality of sputtering materials to form the ceramic thin film including the one or more nanotwinned regions at a deposition rate in a range of 0.1-0.8 nanometers per second.

In a third example, a device includes a substrate with a surface; and a ceramic thin film. The ceramic thin film resides on the surface of the substrate to enhance mechanical properties of the substrate. The ceramic thin film includes crystalline grains. Each of the crystalline grains includes one or more nanotwinned regions with a volume fraction in a range of 30-80% of the ceramic thin film.

In a fourth example, a ceramic thin film includes crystalline grains. Each of the crystalline grains comprises one or more nanotwinned regions with a volume fraction in a range of 30-80% of the ceramic thin film.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple embodiments separately or in any suitable sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

What is claimed is:

1. A method of manufacturing a ceramic thin film on a surface of a substrate in an evacuated chamber, the ceramic thin film comprising crystalline grains, wherein each of the crystalline grains comprises one or more nanotwinned regions with a volume fraction in a range of 30-80% of the ceramic thin film, the ceramic thin film comprises titanium, nitrogen, and boron, and a boron concentration of the ceramic thin film is in a range of 2-18 atomic percent, the method comprising:
providing a plurality of targets comprising a plurality of sputtering materials, wherein the plurality of targets comprises a first target and a second target, the first target comprising titanium metal and the second target comprising titanium boride;
forming a gas atmosphere in the evacuated chamber, wherein the atmosphere comprises nitrogen; and
supplying electric power to the plurality of targets to cause co-sputtering of the plurality of sputtering materials to form the ceramic thin film comprising the one or more nanotwinned regions.

2. The method of claim 1, wherein the substrate comprises one of stainless steel, metal alloy, silicon, or magnesium oxide.

3. The method of claim 1, wherein the substrate comprises a titanium alloy.

4. The method of claim 1, wherein the crystalline grains in the ceramic thin film are embedded in an amorphous matrix.

5. The method of claim 4, wherein the crystalline grains and the amorphous matrix comprise titanium, boron, and nitrogen.

6. The method of claim 1, wherein the gas atmosphere further comprises argon, and a nitrogen fraction in the gas atmosphere is about 20%.

7. The method of claim 1, wherein a dimension of each of the crystalline grains is in a range of 8-16 nanometers.

8. The method of claim 1, wherein a twin spacing in each of the one or more nanotwinned regions is in a range of 0.35-0.65 nanometers.

9. The method of claim 1, comprising:
co-sputtering the plurality of sputtering materials on the surface of the substrate at a deposition rate in a range of 0.1-0.8 nanometers per second.

10. The method of claim 1, wherein a thickness of the ceramic thin film is equal to or greater than 400 nanometers.

11. The method of claim 1, comprising:
applying a substrate bias on the substrate, the substrate bias being in a range of −130 to −50 volt.

12. The method of claim 1, comprising:
co-sputtering the plurality of sputtering materials on the surface of the substrate at a temperature, the temperature being equal to or less than 400 degrees Celsius.

13. The method of claim 1, comprising:
co-sputtering the plurality of sputtering materials without applying heating or cooling to the substrate.

14. The method of claim 1, wherein supplying the electrical power comprises:
applying first DC power on the first target; and
applying second DC power on the second target,
wherein the first DC power is equal to 450 watt and the second DC power is in a range of 50-200 watt.

15. The method of claim 1, comprising:
prior to supplying the electric power to the plurality of targets, forming an interlayer on the surface of the substrate; and
forming the ceramic thin film by co-sputtering the plurality of sputtering materials on the interlayer.

* * * * *